United States Patent [19]
Pinkney

[11] Patent Number: 5,102,181
[45] Date of Patent: Apr. 7, 1992

[54] CONCEALED ROTATING RADIO FOR CAR DASHBOARDS AND THE LIKE

[76] Inventor: Osten C. Pinkney, 1320 Fulton Ave., Apt. #C-7, Bronx, N.Y. 10456

[21] Appl. No.: 710,750

[22] Filed: May 31, 1991

[51] Int. Cl.⁵ .......................... B60R 7/06; B60R 11/02
[52] U.S. Cl. .................................. 296/37.12; 312/7.1; 312/305; 312/319; 224/282
[58] Field of Search ............ 296/37.8, 37.12, 70; 312/7.1, 30, 248, 252, 319, 305; 224/282

[56] References Cited

U.S. PATENT DOCUMENTS

| | | | |
|---|---|---|---|
| 1,295,232 | 2/1919 | Stewart | 312/305 X |
| 2,047,516 | 7/1936 | Lutsche | 312/252 X |

FOREIGN PATENT DOCUMENTS

| | | | |
|---|---|---|---|
| 3703127 | 8/1988 | Fed. Rep. of Germany | 296/70 |
| 68414 | 3/1914 | Switzerland | 312/305 |

Primary Examiner—Dennis H. Pedder
Attorney, Agent, or Firm—Richard L. Miller

[57] ABSTRACT

A device for concealing an electronic piece of equipment within a dashboard of a motor vehicle is provided and consists of a cylindrical console having a compartment in one side for holding an electronic piece of equipment therein. The console is rotatively mounted within the dashboard. A mechanism for rotating the console in one direction within the dashboard to conceal the electronic piece of equipment and in an opposite direction within the dashboard to expose the electronic piece of equipment mounted within the console.

3 Claims, 1 Drawing Sheet

CONCEALED ROTATING RADIO FOR CAR DASHBOARDS AND THE LIKE

BACKGROUND OF THE INVENTION

The instant invention relates generally to protective devices and more specifically it relates to a device for concealing an electronic piece of equipment within a dashboard of a motor vehicle.

Numerous protective devices have been provided in the prior art that are adapted to prevent the theft of equipment mounted on the instrument panels of various types of vehicles. For example, U.S. Pat. Nos. 4,299,361 to Webb, 4,475,366 to Marneris and 4,717,195 to Okuyama et al. all are illustrative of such prior art. While these units may be suitable for the particular purpose to which they address, they would not be as suitable for the purpose of the present invention as hereafter described.

SUMMARY OF THE INVENTION

A primary object of the present invention is to provide a device for concealing a radio or other electronic equipment within a dashboard of a motor vehicle that will overcome the shortcomings of the prior art devices.

Another object is to provide a device for concealing an electronic piece of equipment within a dashboard of a motor vehicle that includes a console for holding the radio et cetera which can rotate one hundred and eighty degrees within the dashboard to conceal the radio.

An additional object is to provide a device for concealing an electronic piece of equipment within a dashboard of a motor vehicle that is convenient for an owner of the motor vehicle since the electronic piece of equipment does not have to be pulled out and carried around to prevent the theft of the electronic piece of equipment as is the case if left in a regular dashboard of the motor vehicle.

A further object is to provide a device for concealing an electronic piece of equipment within a dashboard of a motor vehicle that is simple and easy to use.

A still further object is to provide a device for concealing an electronic piece of equipment within a dashboard of a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 4 is a partial diagrammatic cross sectional view taken on line 4—4 in FIG. 3.

DETAILED DESCRIPTION OF THE PREFERRED EMBODIMENTS

Figure 1:
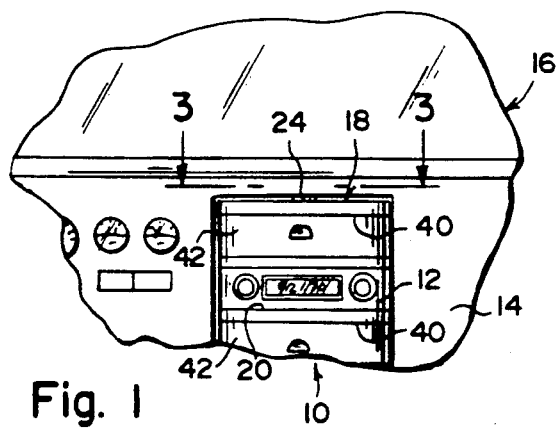
FIG. 1 is a front view of a portion of a dashboard with the instant invention installed therein, showing the electronic piece of equipment facing outwardly.
Figure 1A:
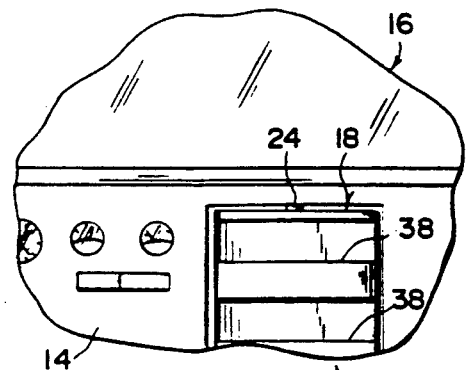
FIG. 1A is a front view similar to FIG. 1 with the instant invention rotated 180 degrees showing empty compartments of the rotating console facing outwardly.
Figure 2:
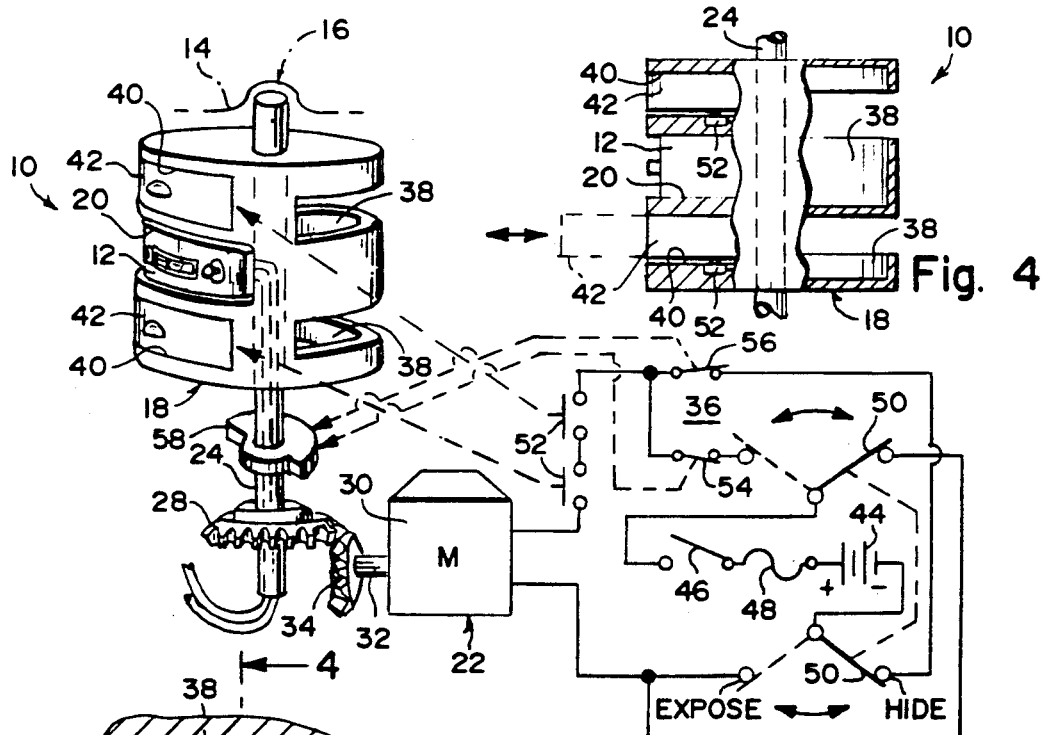
FIG. 2 is a diagrammatic combination perspective view and electrical schematic diagram of the instant invention.
Figure 3:
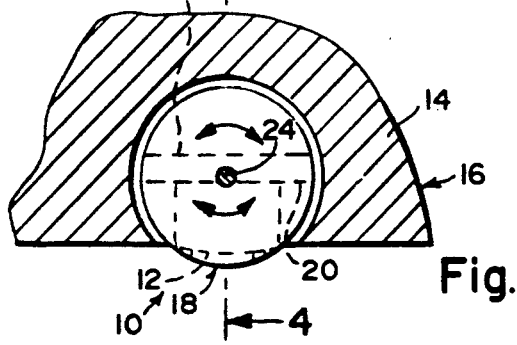
FIG. 3 is a diagrammatic top cross sectional view taken along line 3—3 in FIG. 1, showing the relationship of the rotatable console within the dashboard.

Turning now descriptively to the drawings, in which similar reference characters denote similar elements throughout the several views, the figures illustrate a device 10 for concealing an electronic piece of equipment 12 within a dashboard 14 of a motor vehicle 16 which consists of a cylindrical console 18 having a compartment 20 in one side for holding the radio-tape deck or any other electronic piece of equipment such as a CB (citizen band transceiver), telephone, TV, et cetera 12 therein. The console 18 is rotatively mounted within the dashboard 14. A mechanism 22 is for rotating the console 18 in one direction within the dashboard 14 to conceal the electronic piece of equipment 12 and in an opposite direction within the dashboard 14 to expose the electronic piece of equipment 12.

The rotating mechanism 22 includes a vertical shaft 24 extending through the console 18 to rotate within the dashboard 14, whereby the wiring 26 from the electronic piece of equipment 12 can extend through a portion of the vertical shaft 24. A large bevel gear 28 is affixed to the vertical shaft 24. An electric motor 30 has a drive shaft 32 extending therefrom. A small bevel gear 34 is affixed to the drive shaft 32 and is engagable with the large bevel gear 28. An electrical circuit 36 is connected to the electric motor 30 for causing the drive shaft 32 to rotate in one direction and then in an opposite direction thereby causing the console to rotate accordingly via the bevel gears 28 and 34.

The console 18 has a first pair of empty compartments 38 in an opposite side from the electronic piece of equipment compartment 20 and a second pair of compartments 40 in the electronic piece of equipment compartment side. A pair of pull out drawers 42 are disposed in the rotating console 18 in the electronic piece of equipment compartment side thereof with the first drawer 42 in the compartment 40 above and the electronic piece of equipment compartment 20, and the second drawer 42 in the compartment 40 below the electronic piece of equipment compartment 20.

The electrical circuit 36 includes the vehicle's battery 44 to supply electrical current to the electric motor 30. A switch 46 is to turn the electric motor 30 on and off, while a fuse 48 is to protect the electrical circuit 36 if accidentally overloaded. Reversing switch 50 is to change direction of rotation of the electric motor 30. A pair of micro switches 52 are also provided with each located in one of the drawer compartments 40. If one of the drawers 42 is pulled out of the rotating console 18, the respective micro switch 52 will open to prevent the electric motor 30 from revolving the rotating console 18.

To hide the electronic piece of equipment 12 a person can simply turn on the switch 46 and then place the reversing switch 50 in its proper position. This will rotate the console 18 one hundred and eighty degrees in the dashboard 18 to expose the empty compartments 38. Conversely when so desired the reversing switch 50 can then be put in its reverse position and this will cause the console 18 to rotate one hundred and eighty degrees in an opposite direction to expose the electronic piece of equipment 12 again.

In order to limit the degrees of rotation of the rotative console 18 a desired amount, typically 180 degrees, a cam 58 is fixedly secured to the shaft 24 so as to rotate therewith as a unit. A pair of micro switches 54 and 56 are mechanically aligned with cam 58 so that when the equipment is in the fully exposed position micro switch 54 is caused to open preventing the console 18 from rotating further passed the open position and conversely when the equipment is in the fully hidden position micro switch 56 is caused to open preventing the console 18 from rotating further passed the closed position.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A device for concealing an electronic piece of equipment within a dashboard of a motor vehicle which comprises:
   a) a cylindrical console having a compartment in one side for holding the electronic piece of equipment therein, said console secured by means which permit rotation within the dashboard; and
   b) means for rotating said console in one direction within the dashboard to conceal the electronic piece of equipment and in an opposite direction within the dashboard to expose the electronic piece of equipment, wherein said rotating means includes:
      i) a shaft extending through said console to rotate within the dashboard, whereby a wiring from the electronic piece of equipment can extend through a hollow portion of said shaft;
      ii) a first gear affixed to said shaft;
      iii) an electric motor having a drive shaft extending therefrom;
      iv) a second gear affixed to the drive shaft and engagable with said first gear; and
      v) an electrical circuit connected to said electric motor for causing the drive shaft to rotate in one direction and then in an opposite direction thereby causing said console to rotate accordingly, via said gears.

2. A device as recited in claim 1, further including:
   a) said console having a first pair of empty compartments in an opposite side from the electronic piece of equipment compartment and a second pair of compartments in the electronic piece of equipment compartment side;
   b) a pair of pull out drawers disposed in said console in the electronic piece of equipment compartment side thereof, with one said drawer in the compartment above and the other said drawer in the compartment below the electronic piece of equipment compartment.

3. A device as recited in claim 2, wherein said electrical circuit includes:
   a) a connection means to said vehicle battery to supply electrical current to said electric motor;
   b) a switch to turn said electric motor on and off;
   c) a fuse to protect said electrical circuit when overloaded;
   d) a reversing switch to change direction of rotation of said electric motor;
   e) a pair of micro switches, each located in one of the drawer compartments, so that if one of said drawers is pulled out of said console, said respective micro switch will open to prevent said electric motor from revolving said console; and
   f) a cam fixedly secured to said shaft and limit switches mechanically coupled to said cam and electrically connected to said reversing switch so as to prevent said console from rotating past an exposed and a hidden position.

* * * * *